United States Patent
Mason et al.

(10) Patent No.: US 10,467,143 B1
(45) Date of Patent: Nov. 5, 2019

(54) EVENT-DRIVEN CACHE

(71) Applicant: Amazon Technologies, Inc., Seattle, WA (US)

(72) Inventors: Brannon Mason, Seattle, WA (US); Bradley Lyman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 304 days.

(21) Appl. No.: 15/444,128

(22) Filed: Feb. 27, 2017

(51) Int. Cl.
*G06F 12/0875* (2016.01)
*H04L 29/08* (2006.01)

(52) U.S. Cl.
CPC .... *G06F 12/0875* (2013.01); *G06F 2212/283* (2013.01); *H04L 67/2842* (2013.01)

(58) Field of Classification Search
CPC ............... G06F 3/00; G06F 3/06–0689; G06F 5/00–16; G06F 9/00–548; G06F 11/00–3696; G06F 12/00–16; G06F 13/00–4295; G06F 16/00–986; G06F 17/00–5095; G06F 21/00–88; G06F 2003/0691–0698; G06F 2009/3883; G06F 2009/45562–45595; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G11C 15/00–06; G11C 16/00–3495; G11C 17/00–18; G11C 2216/00–30;
(Continued)

(56) References Cited

U.S. PATENT DOCUMENTS 4,429,363 A * 1/1984 Duke .................. G06F 12/0866
711/122
5,925,108 A * 7/1999 Johnson .................. G06F 15/17
718/1
(Continued)

OTHER PUBLICATIONS

Microarchitectural implications of event-driven server-side web applications; Zhu et al.; 48th Annual IEEE/ACM International Symposium on Microarchitecture; Dec. 5-9, 2015 (Year: 2015).*
(Continued)

*Primary Examiner* — Daniel C. Chappell
(74) *Attorney, Agent, or Firm* — Robert C. Kowert; Meyertons, Hood, Kivlin, Kowert & Goetzel, P.C.

(57) ABSTRACT

An event-driven-cache service receives a request from a client to establish a cache. In response, the event-driven-cache service registers a cache function in an event-driven compute service and defines events that trigger the cache function in the event-driven compute service. The event-driven compute service receives a request to get data from or set data to the cache. In response to the request, the event-driven compute service sends event information to a selected container and the container launches the cache function. For a set request, the cache function adds data to a dedicated persistent storage of the container. For a get request, the cache function determines whether requested data is valid in the dedicated persistent storage and returns the data or a miss indication to the client. Upon completion of the request, the container terminates the cache function and the data remains in the dedicated persistent storage of the container.

20 Claims, 11 Drawing Sheets

(58) Field of Classification Search
CPC . H04L 49/00–9094; H04L 61/00–6095; H04L 67/00–42
See application file for complete search history.

(56) References Cited

U.S. PATENT DOCUMENTS

| | | | | |
|---|---|---|---|---|
| 6,826,599 | B1* | 11/2004 | Shaffer | G06F 12/0888 709/213 |
| 6,978,278 | B2* | 12/2005 | White | G06F 12/084 |
| 7,765,304 | B2* | 7/2010 | Davis | G06F 11/203 709/217 |
| 8,726,264 | B1* | 5/2014 | Allen | G06F 8/68 717/168 |
| 9,037,963 | B1* | 5/2015 | Chandi | G06F 16/95 715/234 |
| 9,069,737 | B1* | 6/2015 | Kimotho | G06F 11/1484 |
| 9,146,764 | B1* | 9/2015 | Wagner | G06F 9/45533 |
| 9,229,869 | B1* | 1/2016 | Parakh | G06F 12/084 |
| 9,363,134 | B1* | 6/2016 | Goodspeed | H04L 29/06 |
| 9,384,139 | B2* | 7/2016 | Baz | G06F 12/0875 |
| 9,542,335 | B1* | 1/2017 | Elving | G06F 12/121 |
| 9,792,057 | B1* | 10/2017 | Pujari | G06F 3/0619 |
| 10,051,087 | B2* | 8/2018 | Tsirkin | H04L 67/42 |
| 10,209,991 | B2* | 2/2019 | Bhaskaran | G06F 9/30043 |
| 2002/0147770 | A1* | 10/2002 | Tang | H04L 29/06 709/203 |
| 2002/0198991 | A1* | 12/2002 | Gopalakrishnan | H04L 29/06 709/225 |
| 2004/0267906 | A1* | 12/2004 | Truty | H04L 29/06 709/219 |
| 2006/0136573 | A1* | 6/2006 | Loven | H04L 29/06 709/219 |
| 2007/0118841 | A1* | 5/2007 | Driver | G06F 9/542 719/314 |
| 2014/0019577 | A1* | 1/2014 | Lobo | H04L 67/2842 709/213 |
| 2014/0281211 | A1* | 9/2014 | Evans | G06F 3/0647 711/111 |
| 2015/0261674 | A1* | 9/2015 | Wei | G06F 12/0866 711/135 |
| 2015/0370719 | A1* | 12/2015 | Heidelberger | G06F 12/0888 711/138 |
| 2016/0301739 | A1* | 10/2016 | Thompson | G06F 9/541 |

OTHER PUBLICATIONS

An in-memory object caching framework with adaptive load balancing; Cheng et al.; Proceedings of the Tenth European Conference on Computer Systems, Article No. 4; Apr. 21-24, 2015 (Year: 2015).*

* cited by examiner

EVENT-DRIVEN CACHE

BACKGROUND

Many of today's computer applications send data to and receive data from remote data stores and remote computer applications. For example, a software application on a client device may use an internet connection to send data to and receive data from a remote database or a remote database application. In some instances, a large number of requests for data may occur. For example, a software application may make frequent requests for particular data from a remote database or application. Such scenarios may often occur for various service providers. In many cases, multiple different applications and different clients each make requests for data from the same or different remote databases or applications.

Due to the large number of requests by a given client application for data from a given data source, a significant portion of time may be spent waiting for data to be returned to the software application. In some cases, additional computer equipment or data storage devices may be used in an attempt to reduce the amount of time for a client application to retrieve data. However, the configuration of additional computer equipment and the maintenance of the additional computer equipment may incur significant cost and time. For example, a fleet of storage servers may introduce a complicated and costly computer infrastructure to maintain. Moreover, keeping track of the status and health of each storage server in the fleet and replacing failed equipment may become a burdensome processes.

Figure 1:
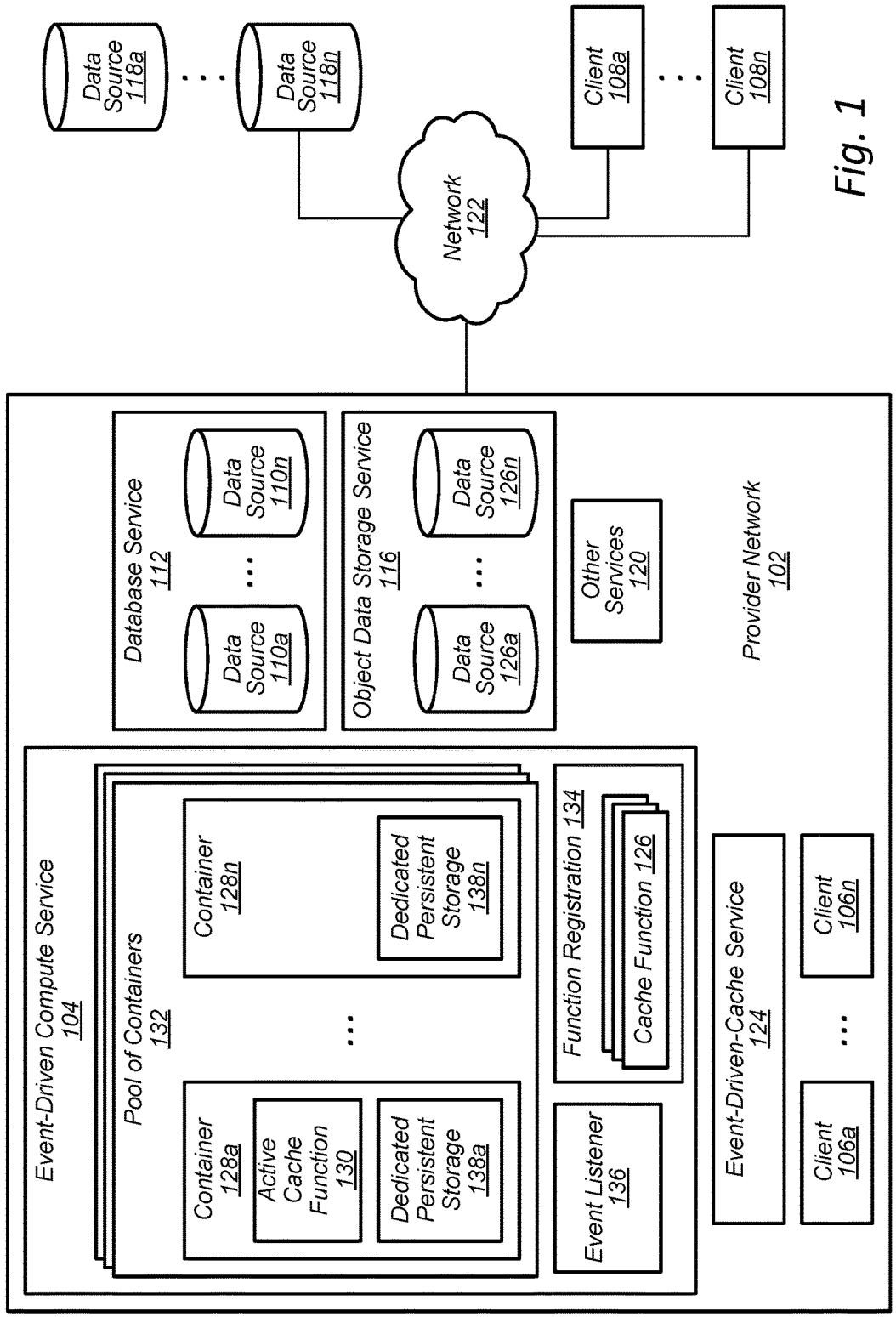
FIG. 1 illustrates a system for providing event-driven caches for client devices, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement event-drive caches for clients of a provider network. An event-driven-cache service may receive a request from a client to establish a cache. In response, the event-driven-cache service registers a cache function in an event-driven compute service and defines events that trigger the registered cache function in the event-driven compute service. In response to a triggering event (e.g., get request or set request), the registered cache function launches and may retrieve data from or store data into a dedicated persistent storage associated with the cache function. After responding to an event, the cache function terminates, but data remains stored in the dedicated persistent storage.

In embodiments, the event-driven compute service may receive a request to get data from the cache or set data to the cache. The request may include an identifier for the data and/or an identifier for the cache. If the request is a set request, then the request may also include the data corresponding to the identifier for the data. If the event-driven compute service determines that the request matches a defined event to trigger the registered cache function, then the event-driven compute service selects a container (e.g., from a pool of available containers) and sends event information based on the request to the selected container.

In response to receiving the event information, the selected container launches the registered cache function. If the request is a set request, then the registered cache function adds the data according to the identifier for the data to a dedicated persistent storage of the container. For example, the registered cache function may add the data and the identifier for the data to the dedicated persistent storage. In embodiments, if data corresponding to the identifier for the data already exists in the dedicated persistent storage, then the registered cache function may overwrite the currently existing data with the data included in the request.

If the request is a get request, then the registered cache function determines whether the data corresponding to the identifier for the data is valid in the dedicated persistent storage. If so, then the registered cache function returns the data to the client. If not, then the registered cache returns a miss to the client. For example, if the data corresponding to the identifier for the data is not present in the dedicated persistent storage or is stale data, then the registered cache function returns a miss to the client. In embodiments, the selected container terminates the registered cache function upon completion of the set request or get request and the data in the dedicated persistent storage of the container remains in the dedicated persistent storage of the container after the registered cache function is terminated.

In some embodiments, the client and/or client application sending the request to get or set data to the cache is unaware of aspects of the event-driven compute service and/or how the event-driven compute service is implemented. For example, to implement the registered cache function, the event-driven compute service may execute code on one or more computing devices of the provider network, wherein the client and/or the client application is unaware of the identity and/or network address of the one or more computing devices. Thus, in embodiments, the registered cache function and/or other code may be executed in response to events (e.g., receiving the request to get or set data to the cache), without the client and/or the client application having to manage, own, or run a fleet of dedicated servers to execute code on.

Thus, in various aspects, use of the event-driven-cache service and/or the event-driven compute service enables a "server-less" service. Without the use of the event-driven-cache service and/or the event-driven compute service, a client that needs to establish and use a cache may need to manage its own a fleet of servers to listen to events (e.g., cache request) and to manage identities and security credentials for the fleet of servers in order to accept and/or authenticate client devices to establish connections. However, as described below, embodiments may allow a client to listen for events and to handle a large volume of cache requests without the requirement for additional server infrastructure that needs to be managed by the client.

As the number of cache requests increases, the benefits of using an event-driven-cache service and/or an event-driven compute service increase. As discussed, embodiments allow a client to reduce or eliminate the need to own or manage servers dedicated to handling cache requests. Moreover, the registered cache function may only be active when responding to a get request or a set request. Thus, when not responding to a get request or a set request, the event-driven-cache service and/or the event-driven compute service may not be required to consume computing resources (CPU processing, memory, storage, network bandwidth), which may reduce the cost of using the service for clients as well as the service provider. Therefore, various embodiments provide ways for clients to reduce cost, reduce network delays and traffic, reduce communication errors, and reduce the amount of computing infrastructure/devices required to implement a cache for clients.

FIG. 1 illustrates a system 100 for providing event-driven caches for client devices, according to some embodiments. In embodiments, the provider network 102 depicted in FIG. 1 may be the same type of provider network, and include some or all of the components as other provider networks depicted in FIGS. 1-10.

In the depicted embodiment, the provider network 102 includes an event-driven compute service 104 that implements one or more caches associated with each of one or more clients. In embodiment, a given cache may be used for data of one or more primary data sources. Thus, the event-driven compute service 104 may receive cache requests from one or more clients 106 (e.g., client device and/or software application). In embodiments, each of the clients 106 may send one or more cache requests to the event-driven compute service 104. For example, a client 106a may send a get request and at a later time the client 106a may send a set request. As shown, the clients 106 are within the provider network. For example, the clients 106 may be software applications running on a compute instance and/or computing device within the provider network 102. In some embodiments, some or all of the clients may be external clients 108 that are located external to the provider network 102. For example, the clients 108 may be located at a client's data center or other external location used by a client of the provider network 102.

In embodiments, any of the clients 106, 108 may access one or more data sources as a primary data source. A data source may be within the provider network, such as a data source 110 of a database service 112 or a data source 114 of an object data storage service 116. A data source may be a data store and/or software application external to the provider network, such as an external data source 118. In embodiments, a data source may be a software application within the provider network 102, such as one or more other services 120. As shown, a network 122 may allow external clients 108 and external data sources 118 to communicate with the provider network 102 and with each other. Thus, in embodiments, a given cache may bused for data of one or more internal data sources 110, 114, 120 and/or one or more external data sources 118.

In some instances, before a client can use a cache implemented by the event-driven compute service 104, the client must first establish the cache by sending a request to establish the cache to an event-driven-cache service 124. The request may include any suitable data that can be used to establish the cache and to allow the client to use the cache, such as configuration parameters for the cache, an identifier for the client, and an identifier for the cache. In some instances, some or all of the actions performed by an event-driven-cache service are performed external to the provider network 102. For example, a client (e.g., client 106a, client 108a, or one or more devices at a location of a client external to the provider network 102) may implement some or all of the functionality of an event-driven-cache service or another third party may implement some or all of the functionality of an event-driven-cache service.

Upon receiving the request to establish the cache, the event-driven-cache service 124 may register a cache function 126 in the event-driven compute service 124. To register a cache function 126, the event-driven-cache service 124 may select a particular cache function from number of cache functions of the event-driven compute service 104 that are available for selection. In embodiments, each of the plurality of cache functions available for selection (e.g., function code, identifiers for each function, and/or any other associated information), may be stored in a data storage of the event-driven compute service 104 and/or any other data storage of the provider network 102 (e.g., database service 112 or object data storage service 116) or any data storage used by with the provider network.

In some embodiments, the function code may be written and/or provided by the provider network 102. In some cases, the function code may be written by the client and provided to the provider network 102. In other embodiments, a portion of the function code is written and/or provided by the provider network 102 and a portion of the function code is written by the client and provided to the provider network 102.

The event-driven-cache service 124 may perform one or more additional actions after registering the cache function 126 (or as a part of registering the selected cache function 126). For example, the event-driven-cache service 124 may assign an identifier for the registered cache function 126 and/or define one or more events that trigger the registered cache function 126, which causes a selected container to launch the registered cache function 126 (e.g., invoke, execute, or activate the function). For example, in response to receiving a request from a particular client to set data to a cache, the event-driven compute service 124 may select the container 128a and launch the registered cache function 126 for execution as an active cache function 130 running on the container 128a.

In embodiments, a number of containers are each assigned to the registered cache function 126 to form a pool of containers 132 for the registered cache function 126. A given container may be an execution environment capable of executing the registered cache function 126. For example, each container of the pool of containers 132 may include a java virtual machine capable of executing the registered cache function 126. In embodiments, each container of the pool of containers 132 may be any other execution environment capable of executing the registered cache function 126. In some embodiments, event-driven compute service 104 may include any number of different execution environments that may be used to execute any number of different registered cache functions.

As shown, function registration 134 may store identifiers within the event-driven compute service 104 for one or more registered functions. Additional data associated with registered functions may also be stored in function registration 134, such as defined events that trigger a registered cache function in the event-driven compute service 104. In embodiments, function registration 134 may be a table, list, or any other data structure suitable for storing data associated with registered functions. In embodiments, some or all of the data associated with registered functions is stored in the provider network 102 outside of the event-driven compute service 104 (e.g., in the event-driven-cache service 124, the database service 112, object data storage service 116) or external to the provider network 102.

In the depicted embodiment, the event listener 136 listens for events that trigger registered cache functions (e.g., a get or set request from a particular client). Thus, the event listener 136 may include data that describes the triggering events or has access to data that describes the triggering events. In an embodiment, the event listener 136 receives a request and determines that the request matches a defined event for the registered cache function 126. In response, the event listener 136 selects a container from the pool of containers 132 and sends event information based on the request to the selected container. In response, the selected container launches the registered cache function 126 as an active cache function 130. In various embodiments, actions performed by the event-driven compute service 104, including actions by the event listener 136 and the function registration 134, may be performed by the same service/software module and/or hardware or any other combination of services/software modules and/or hardware of the event-driven compute service.

In embodiments, based on the received event information, the active cache function 130 may perform different actions. For example, for a get request or a set request, the active cache function 130 may access and/or modify the dedicated persistent storage 138a. In embodiments, each of the containers 128 includes a dedicated persistent storage 138, where data that is accessed and/or modified by an active cache function 130 of the respective container remains stored after the active cache function 130 is terminated. In embodiments, the dedicated persistent storage 138 also stores cache function code for the registered cache function 126.

The dedicated persistent storage may be any type of storage that stores and persists data, even when the registered cache function is not running as an active cache function. Thus, data may be persisted in between launches or executions of the registered cache function. For example, the data may be persisted even though a container may be frozen or otherwise not consuming compute resources for a period of time. In embodiments, the data may be persisted through a re-boot of a host of the container and through a failure of the host of the container. In various embodiments, the dedicated persistent storage includes one or more of solid state storage, hard disk, RAM, ROM, system memory, and any other suitable type of persistent storage, including types of storage described herein (e.g., volatile and/or non-volatile).

Figure 2:
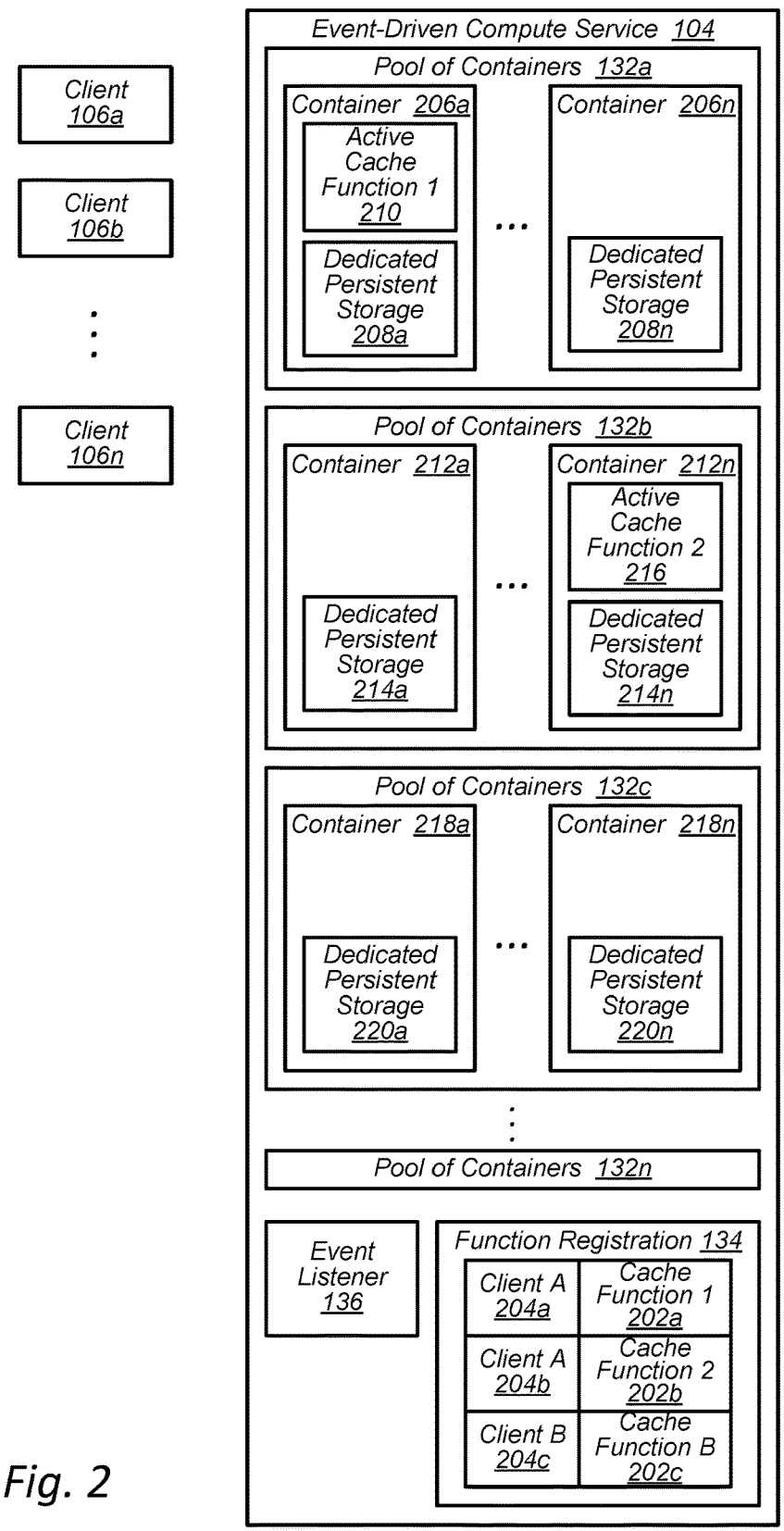
FIG. 2 is a block diagram illustrating example components that implement an event-driven compute service of a provider network, according to some embodiments.

FIG. 2 is a block diagram 200 illustrating example components that implement an event-driven compute service of a provider network, according to some embodiments. In the depicted example, function registration 134 stores identifiers (e.g., name or alias) for three different registered functions as well as an identifier of the client associated with each respective function: cache function 1 202a with client identifier clientA 204a, cache function 2 202b with client identifier clientA 204b, and cache function B 202c with client identifier clientB. In the example embodiment, the client identifier clientA 204a, 204b identifies client 106a and the client identifier clientB 204c identifies client 106b. In embodiments, the entries in the function registration 134 area created in response to requests from the client 106a and the client 106b to establish a cache.

In the depicted example, the pool of containers 132a includes containers 206a-206n that are each assigned to cache function 1 202a. Each container 206a-206n includes a respective dedicated persistent storage 208a-208n. As shown, the container 206a has launched cache function 1 202a, which is running as active cache function 210. In embodiments, the event listener 136 selects container 206a and sends event information to the container 206a in response to receiving a request from the client 106a to set data (or get data) for a cache that was established in response to a cache request received from the client 106a.

The pool of containers 132b includes containers 212a-212n that are each assigned to cache function 1 202b. Each container 212a-212n includes a respective dedicated persistent storage 214a-214n. As shown, the container 212n has launched cache function 2 202b, which is running as active cache function 216. In embodiments, the event listener 136 selects container 212n and sends event information to the container 212n in response to receiving a request from the client 106a to set data (or get data) for a different cache that was established in response to a different cache request received from the client 106a.

As shown, the pool of containers 132c includes containers 218a-218n that are each assigned to cache function B 202c. Each container 218a-218n includes a respective dedicated persistent storage 220a-220n. In the depicted example, none of the containers 218 are running an active cache function. This may occur because the event listener 136 has not recently received a request from the client 106b to set data (or get data) for another cache that was established in response to another cache request received from the client 106b.

Figure 3:
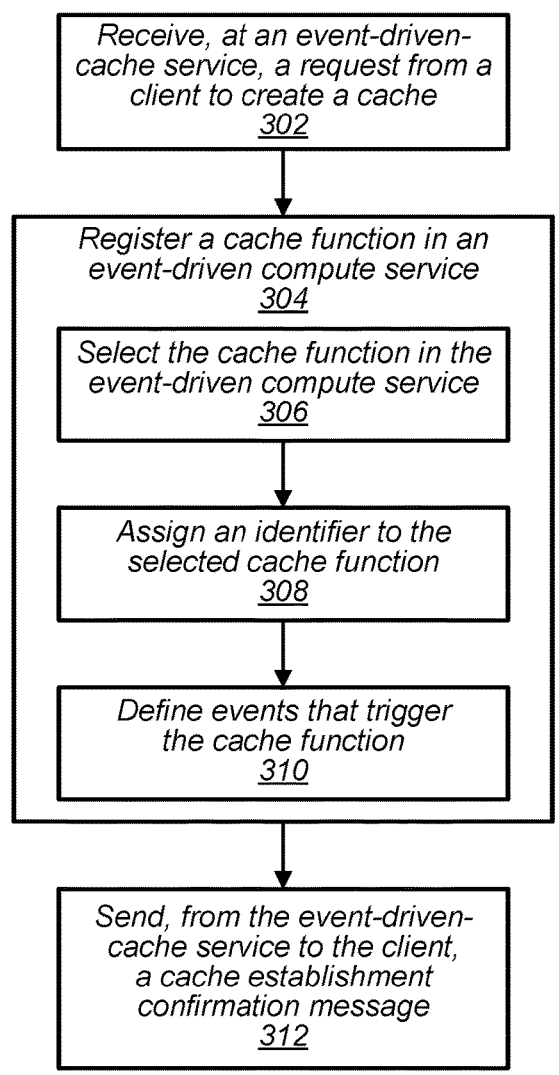
FIG. 3 is a flow diagram of a process for registering a cache function in an event-driven compute service, according to some embodiments.

FIG. 3 is a flow diagram of a process for registering a cache function in an event-driven compute service, according to some embodiments. At block 302, an event-driven-cache service receives a request from a client to create a cache. In embodiments, the request may include one or more identifiers and/or configuration parameters for the cache. For example, the request may include a "time to live" for data in the cache. In some instances, if data has been stored in the cache for at least a threshold amount of time indicated by the time to live (e.g., 1 minute, 2 hours, etc.), then an event-driven compute service will return an indication that the data is stale and/or invalid in response to receiving from a client a get request for the data.

At block 304, in response to receiving the request, the event-driven-cache service registers a cache function in the event-driven compute service. In some embodiments, before registering the cache function, the event-driven-cache service may determine whether the client is authorized and/or authenticated based on information provided in the request. In embodiments, to register the cache function, at block 306, the event-driven-cache service selects a cache function in the event-driven-cache service. The cache function may be selected based the on one or more identifiers and/or configuration parameters included in the request. For example, if the request includes a time to live parameter, then the event-driven-cache service may select a cache function that responds to a get request in accordance with the time to live parameter.

In embodiments, registering the cache function may include additional steps. For example, at block 308, the event-driven-cache service may assign an identifier (e.g., a name or alias) to the selected cache function. In some instances, registering a cache function may also include defining events that trigger the cache function at block 310. For example, the event-driven-cache service may define a get request from the client and/or a set request from the client as two different events that may trigger the cache function. In various embodiments, any other events instead of or in addition to a get request and set request may be defined as events that trigger the cache function. In embodiments, block 308 and block 310 may be steps that occur after the cache function has been registered (e.g., steps to configure the function has been registered).

In embodiments, at block 312, the event-driven-cache service sends a cache establishment confirmation message to the client. The cache establishment confirmation message may include an indication that the cache has been established. In embodiments, the confirmation message or another message to the client may include an identifier for the cache that can be used by the client to use the cache (e.g., use get and set requests). The confirmation message or other message may include and endpoint (e.g., a network address such as an IP address) for the client to specify when sending get or set requests to the event-driven compute service.

In some embodiments, the confirmation message or other message may include one or more application programming interface (API) commands that can be used for the cache (e.g., set data request and get data request). In some instances, the confirmation message or other message may include a client library that includes function code that client may use to implement one or more API commands for the cache (e.g., set data request and get data request). In some cases, the client may already have the library installed, so that, once the cache has been established, the client can send the API commands (e.g., set data request and get data request) to the event-driven compute service or to an endpoint associated with the provider network in order to use the cache.

In various embodiments, the API commands allow a client to use multiple different caches by using different namespaces. For example, the client may establish a first cache with an alias (e.g., name) of "cache1" and a second cache with an alias of "cache2." To set data in the first cache, the client may send a set data API call that includes the name "cache1," an identifier for the data, and the data to be set. To set other data in the second cache, the client may send a set API call that includes the name "cache2," an identifier for the other data, and the other data to be set. To get data from the first cache, the client may send a get API call that includes the name "cache1" and the identifier for the data. In response, the client may then receive the data. In other cases, the client may instead receive a "null" or other indication that there was a cache miss or that the request data is unavailable.

Using the above technique of establishing different caches, the same client can use separate data for multiple data caches. In embodiments, the event-driven-cache services registers different cache functions that correspond to different cache establishment requests from the same client. In embodiments, at least some of the different registered cache functions use the same base code, but are assigned different aliases (e.g. identifiers) in response to different requests to establish a cache.

Figure 4:
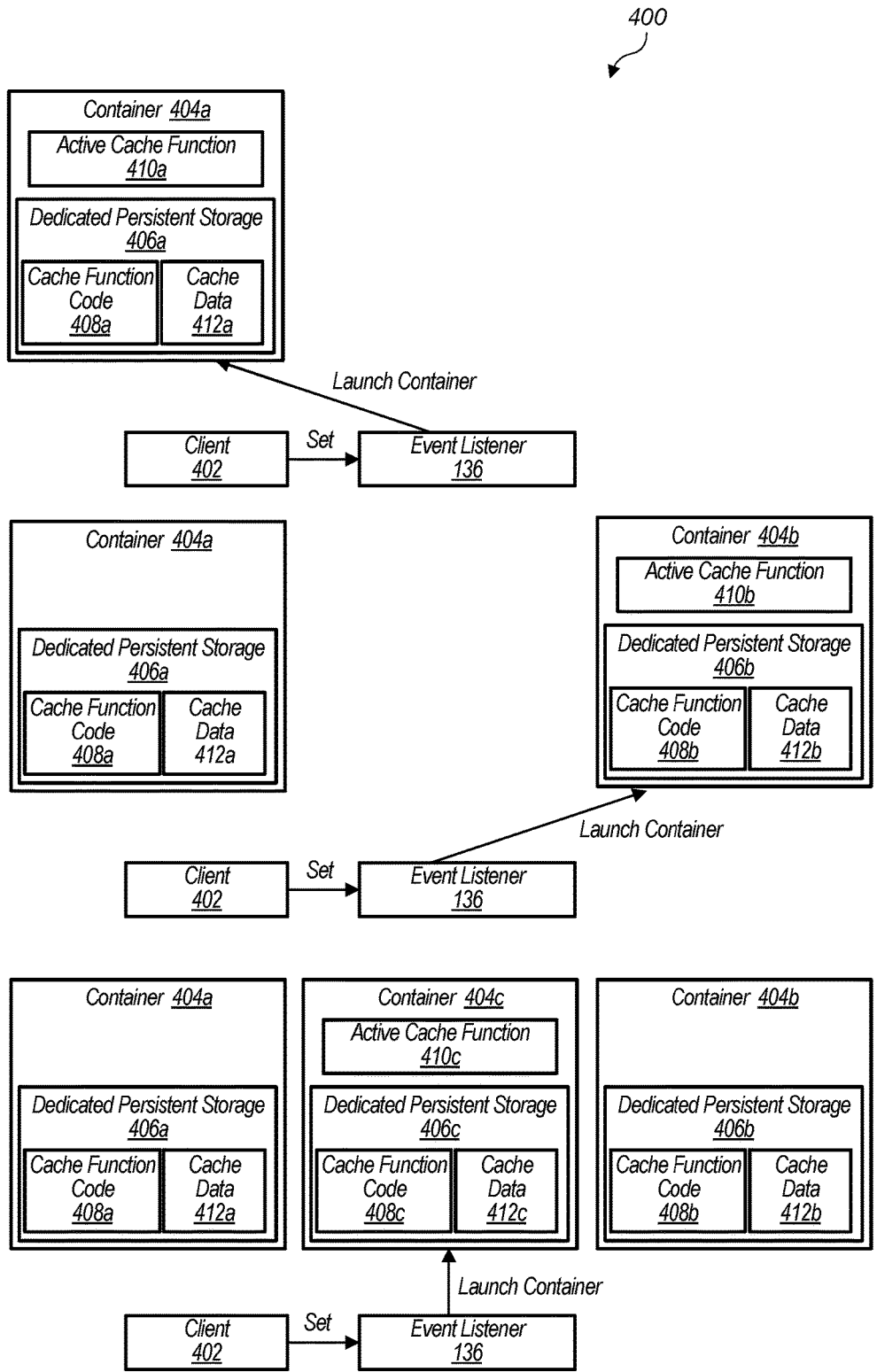
FIG. 4 illustrates a system and a process for launching containers for a cache function in an event-driven compute service, according to some embodiments.

FIG. 4 illustrates a system and a process 400 for launching containers for a cache function in an event-driven compute service, according to some embodiments. In the depicted embodiment, an event-driven-cache service has registered a cache function in the event-driven compute service 104 for a client 402 of the event-driven compute service 104 in response to receiving a request from the client 402 to establish a cache.

The first time that the event-driven compute service 104 determines that a received request from the client 402 matches a defined event for triggering the registered cache function (a set request from the client 402), the event listener 136 may send an initial request to launch the registered cache function to a computing device (e.g., server or other suitable container host/node). In embodiments, the event listener 136 may send to the computing device an initial event information based on the request and/or a request to launch a container. In response to receiving the initial request to launch the registered cache function (or initial event information or request to launch the container), the computing device launches the container 404a and reserves an amount of dedicated persistent storage 406a of the container 404a. In embodiments, the container 404a then receives function code 408a for the registered cache function and stores the function code into a portion of the dedicated persistent storage 406a.

In embodiments, the container 404a then launches the registered cache function as an active registered cache function 410a. Cache data 412a is a portion of the dedicated persistent storage 406a reserved for storing data for the cache that was established for the client 402 in response to the request to establish the cache. In the depicted example, the event information includes data to be set in the cache and an identifier for the data to be set. Thus, the active registered cache function 410a adds the data according to the identifier for the data to the cache data 412a of the dedicated persistent storage 406a (e.g., store the data into the cache data 412a and store the identifier for the data into the cache data 412a in association with the stored data). Upon completion of the set request (e.g., upon completion of the storing of the identifier for the data and the data into the cache data 412*a* and any other actions associated with the set request, if any), the container 404*a* may terminate the active registered cache function 410*a* and any data in the dedicated persistent storage 406*a* may remain stored there after termination of the active registered cache function 410*a*.

In the depicted embodiment, at a later time, the event-driven compute service 104 determines that another received request from the client 402 matches a defined event for triggering the registered cache function (another set request from the client 402). In response, the event listener 136 sends an initial request to launch the registered cache function (or initial event information or request to launch the container) to another or same computing device. In response, the other computing device launches the container 404*b* and reserves an amount of dedicated persistent storage 406*b* of the container 404*b*. In embodiments, the container 404*b* then receives function code 408*b* for the registered cache function and loads the function code into a portion of the dedicated persistent storage 406*b* to store the function code 408*b* in the dedicate persistent storage 406*b*.

In embodiments, the container 404*b* then launches the registered cache function as an active registered cache function 410*b*. Cache data 412*b* is a portion of the dedicated persistent storage 406*b* reserved for storing data for the cache that was established for the client 402 in response to the request to establish the cache. In the depicted example, the event information includes data to be set in the cache and an identifier for the data to be set. Thus, the active registered cache function 410*b* adds the data according to the identifier for the data to the cache data 412*b* of the dedicated persistent storage 406*b* (e.g., store the data into the cache data 412*b* and store the identifier for the data into the cache data 412*b* in association with the stored data). Upon completion of the set request (e.g., upon completion of the storing of the identifier for the data and the data into the cache data 412*b* and any other actions associated with the set request, if any), the container 404*b* may terminate the active registered cache function 410*b* and any data in the dedicated persistent storage 406*b* may remain stored there after termination of the active registered cache function 410*b*.

At a later time, the event-driven compute service 104 determines that an additional received request from the client 402 matches a defined event for triggering the registered cache function (an additional set request from the client 402). In response, the event listener 136 sends an initial request to launch the registered cache function (or initial event information or request to launch the container) to an additional or same computing device. In response, the additional computing device launches the container 404*c* and reserves an amount of dedicated persistent storage 406*c* of the container 404*c*. In embodiments, the container 404*c* receives function code 408*c* for the registered cache function and loads the function code into a portion of the dedicated persistent storage 406*c* to store the function code 408*c* in the dedicate persistent storage 406*c*.

The container 404*c* then launches the registered cache function as an active registered cache function 410*c*. Cache data 412*c* is a portion of the dedicated persistent storage 406*c* reserved for storing data for the cache that was established for the client 402 in response to the request to establish the cache. In the depicted example, the event information includes data to be set in the cache and an identifier for the data to be set. Thus, the active registered cache function 410*c* adds the data according to the identifier for the data to the cache data 412*c* of the dedicated persistent storage 406*c* (e.g., store the data into the cache data 412*c* and store the identifier for the data into the cache data 412*c* in association with the stored data). Upon completion of the set request (e.g., upon completion of the storing of the identifier for the data and the data into the cache data 412*c* and any other actions associated with the set request, if any), the container 404*c* may terminate the active registered cache function 410*c* and any data in the dedicated persistent storage 406*c* may remain stored there after termination of the active registered cache function 410*c*.

In embodiments, each of the containers 404*a*, 404*b*, 404*c* are added to a pool of containers that is assigned to the registered cache function so that each container remains available for re-use for later requests from the client (e.g., get and set requests), instead of launching new containers. However, in embodiments, any other suitable number of containers may be launched and added to a pool of containers for a particular registered cache function. This may reduce consumption of computing resources and reduce the amount of time to service later requests, because the process of launching a container may consume a relatively large amount of compute resources and time.

In embodiments, upon completion of a request, a container may be stored or "frozen" until the container is selected at a later time to service a later request (e.g., a later get or set request). In some embodiments, one or more of the containers of the pool of containers assigned to a registered cache function may be launched without servicing a cache request. For example, the three containers 404*a*, 404*b*, 404*c* may each be launched, have function code stored into dedicated persistent storage, and then frozen. This may reduce response time and reduce consumption of computing resources when responding to future cache requests.

In some instances, the event-driven compute service 104 may determine, based on one or more criteria, that an additional one or more containers needs to be added to the pool of containers. Examples of the criteria are available storage space on one or more of the pool of containers falling below a threshold value, network traffic to and/or from one or more of the pool of containers exceeding a threshold value, performance of one or more hosts for the pool of containers being below a threshold value, and failure of one or more of the pool of containers. Thus, in response to subsequent cache requests from the client, one or more of the additional containers may be launched. This may allow the cache size to scale upwards as more data is used for storing into the cache.

In some embodiments, a container may be removed from the pool. For example, a container may be removed if the container has not been used to service a request for a threshold period of time. In some embodiments, when a container is removed from the pool due to non-use for a threshold period of time, the number of containers assigned to the pool may be reduced. In various embodiments, a get request or any other defined event for the registered cache function may cause the event listener 136 to send a request to launch an additional container.

Figure 5A:
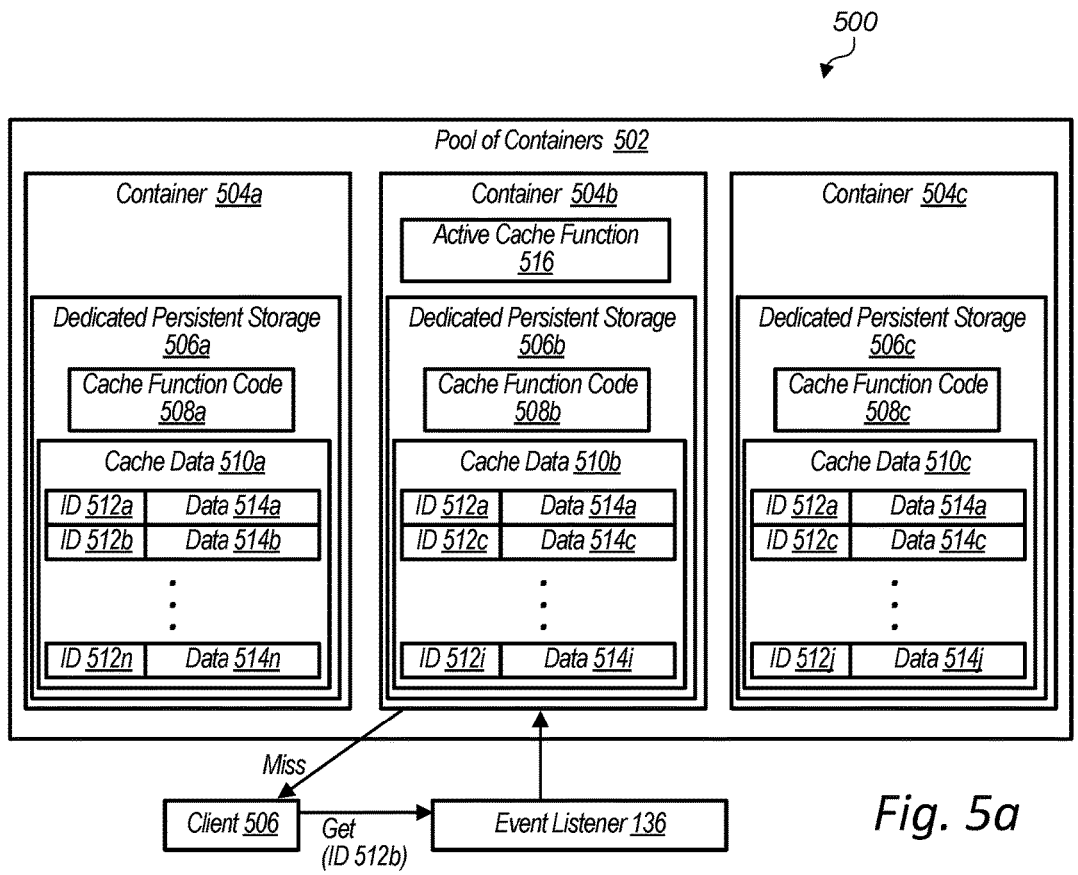
FIG. 5A illustrates a system and a process for responding to a get request at an event-driven compute service, according to some embodiments.

FIG. 5A illustrates a system and a process for responding to a get request at an event-driven compute service, according to some embodiments. In the example embodiment, the pool of containers 502 includes containers 504*a*, 504*b*, 504*c* that are each assigned to a registered cache function that was registered in the event-driven compute service 104 by the event-driven-cache service 124 in response to receiving a request from the client 506 to create a cache. In embodiments, the pool of containers 502 of FIGS. 5*a*, 5*b*, 6*a*, and 6*b* may be the pool of containers described in FIG. 4.

Each of the containers 504a, 504b, 504c include a respective dedicated persistent storage 506a, 506b, 506c, a portion of which stores cache function code 508a, 508b, 508c and another portion of which stores cache data 510a, 510b, 510c for storing data for the cache that was established in response to a request from the client 506 to establish a cache. In the depicted example, cache data 510a includes an identifier 512a for data 514a, stored in association with the data 512 corresponding to the identifier 512a for the data 514a. Similarly, identifier 512b is stored in association with data 514b. Any number of additional identifiers and data items may be stored in the cache data 510a.

Cache data 510b and cache data 510c may also store identifiers and data items in the same way or similar way as cache data 510a. In embodiments, duplicates of some data items may be stored in different ones of the cache data 510a, 510b, 510c and some cache data 510 may have different data items than others. For example, identifier 512a and data 514a is stored in cache data 510a, 510b, and 510c. However, identifier 512b and data 514b is only stored in cache data 510a. As another example, identifier 512c and data 514c is stored in cache data 510b and 510c, but is not stored in cache data 510a. However, cache data 510a, 510b, 510c all correspond to the same registered cache function and the same cache that was established in response to the request from the client 506 to establish the cache.

In the depicted example, the event listener 136 receives a get request from the client 506, selects the container 504b, and sends event information based on the get request to the selected container 504b. To select a container for a given request, one of the containers 504 is selected according to a load balancing mechanism (e.g., based on one or more selection criteria). Examples of the selection criteria are storage space (e.g., for the dedicated persistent storage) on the selected container exceeding (or exceeding by a threshold value) storage space on one or more other containers of the pool, network traffic to and/or from a host of the selected container being below (or below by at least a threshold value) network traffic to and/or from one or more other hosts of other containers of the pool, performance of a host of the selected container being above (or above by at least a threshold value) performance of one or more other hosts of other containers of the pool, and random selection. Any other suitable method for distributing multiple request among each of the containers 504 may be implemented.

In response to receiving the event information, the selected container 504b launches the registered cache function as active registered cache function 410b. In embodiments, if the event information indicates (e.g., via an identifier 512c for the data 514c) the get request is for the data 514c, then the active registered cache function 516 may determine whether the data 514c is stored in the cache data 510b and if so, whether it is valid (e.g. not stale). If so, then the registered cache function 410b may return the data 514c to the client 506 or cause the data 514c to be returned to the client 506. In some cases, the registered cache function 410b does not determine whether the data 510b is valid.

However, if the requested data is not found, then a miss indication is returned to the client 506. As shown, if the event information instead indicates (e.g., based on an identifier 512b indicated in the get request) that the get request is for the data 514b, then the active registered cache function 516 may determine whether the data 514b is stored in the cache data 510b. In the depicted example, since the data 514b is not stored in the cache data 510b, then registered cache function 410b returns a miss indication to the client 506 or causes the miss indication to be returned to the client 506.

Figure 5B:
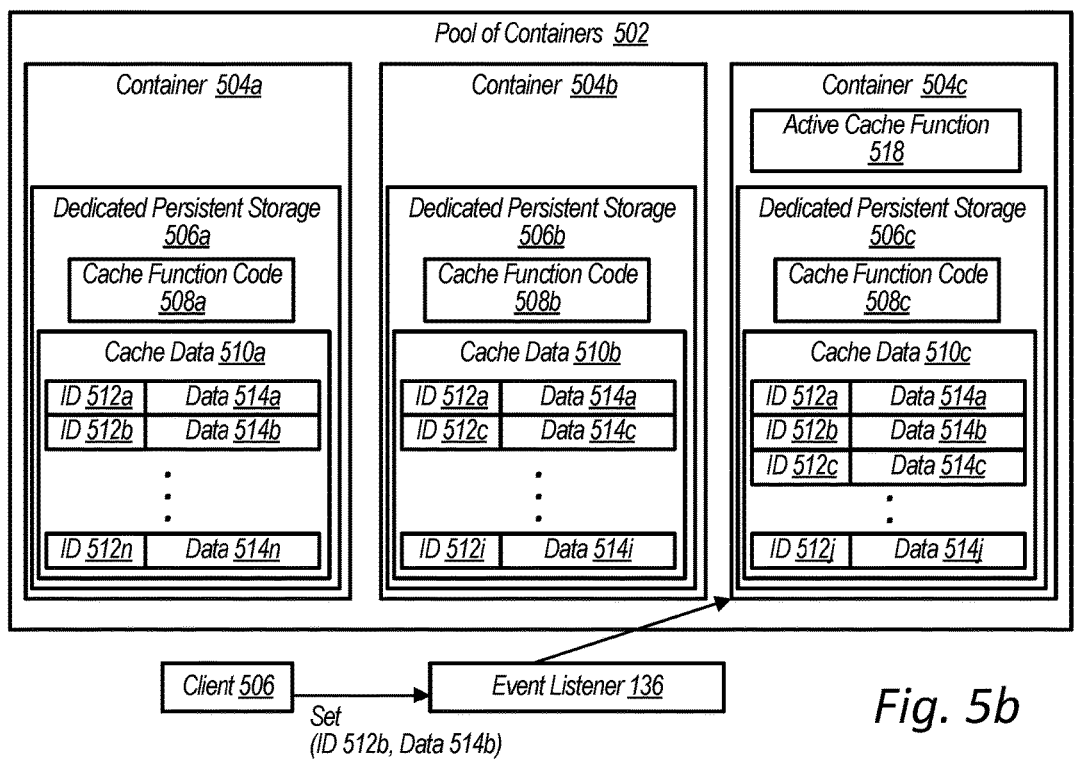
FIG. 5B illustrates a system and a process for responding to a set request at an event-driven compute service, according to some embodiments.

FIG. 5B illustrates a system and a process for responding to a set request at an event-driven compute service, according to some embodiments. In the depicted example, the event listener 136 receives a set request from the client 506, selects the container 504c according to a load balancing mechanism (e.g., based on one or more selection criteria), and sends event information based on the set request to the selected container 504c. For example, the event listener 136 may send the ID 512b and the data 514b, which were included in the set request.

In response to receiving the event information, the selected container 504c launches the registered cache function as active registered cache function 518. In embodiments, if the event information indicates (e.g., via an identifier 512b for the data 514b) the set request is for the data 514b, then the active registered cache function 518 may add the data 514b according to the identifier 512b for the data 514b to the cache data 510c. Although the entry for the data 514b is shown as added in between the entries for data 514a and 514c, in embodiments, the entry for the data 514b may be added or stored into the cache data 510c in any other position relative to any of the existing data entries in the cache data 510c.

In some instances, the active registered cache function 518 may also add a timestamp to the cache data 510c associated with the data 514b when the data 514b is added to the cache data 510c. The timestamp may indicate the time or approximately the time that the data 514b was added to the cache data 510c. Thus, in embodiments, the data 514b may also include the newly-added timestamp. The timestamp may be used to determine whether the data is valid (e.g., stale) at a later time. For example, at a later time, when the registered cache function 518 is running as an active function to response to a get request, then the registered cache function 518 may determine that the requested data has been in the dedicated persistent storage for less than a threshold amount of time (and thus valid) or at least a threshold amount of time (and thus invalid or stale) based on a timestamp associated with the requested data.

In embodiments, if the dedicated persistent storage is full or stores at least a threshold amount of data and a request to set data is received, then the active registered cache function 518 may implement a least recently used (LRU) algorithm or policy to replace data in the dedicated persistent storage 506c. For example, if a particular entry data in the dedicated persistent storage 506c has been not been used or accessed (e.g., via get and/or set) for the longest time with respect to all of the entries in the dedicated persistent storage 506c, then the active registered cache function 518 replaces the particular entry with the data for the set request. However, any other suitable policy may be implemented to replace data in the dedicated persistent storage when it is full or stores at least a threshold amount of data and a request to set data is received (e.g., first in first out, not recently used, etc.). In some embodiments, data may be deleted from the dedicated persistent storage if not accessed for a threshold period of time.

In some embodiments, over a period of time (e.g., the "warm-up" period), set requests to the different containers 504a, 504b, 504c occur such that the data items stored in each cache data 510a, 510b, 510c are the same or similar. For example, over a period of time, the data items in each of the cache data 510a, 510b, 510c will be the same or within a threshold percentage of each other. For example, the cache data 510*a* may include at least 99% of the data items in cache data 510*b* and cache data 510*c*.

Figure 6A:
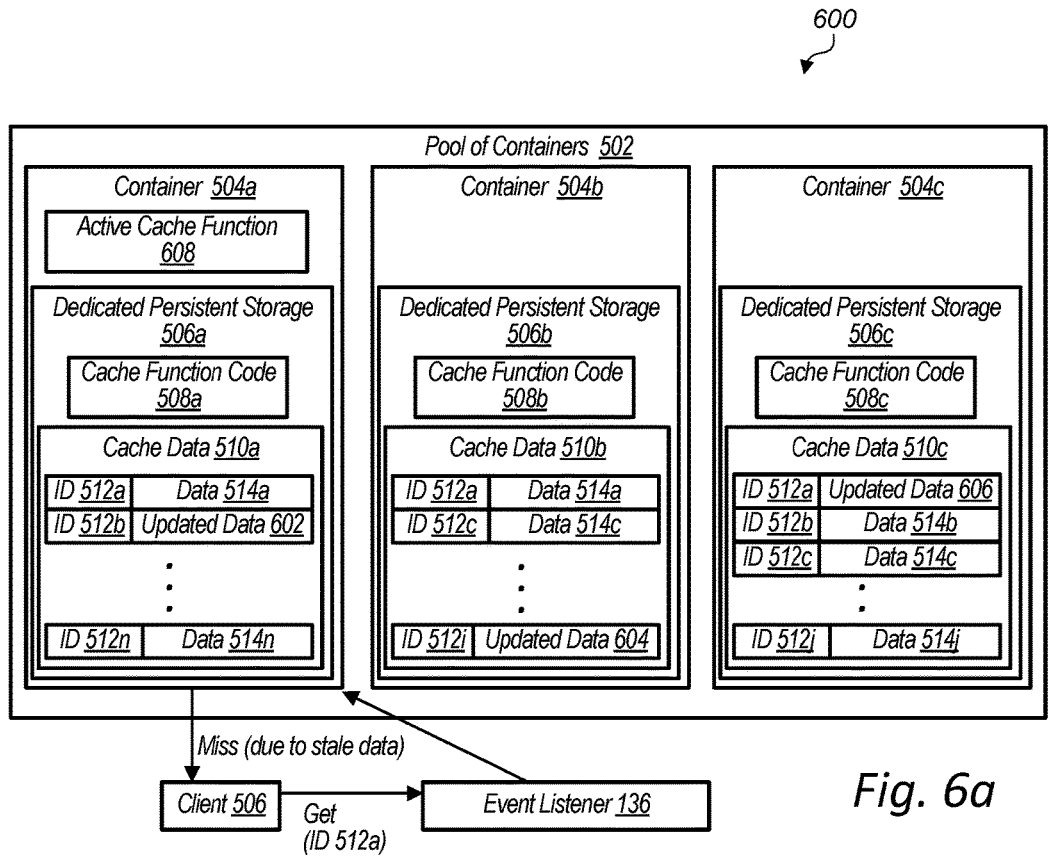
FIG. 6A illustrates a system and a process for responding to a get request at an event-driven compute service, according to some embodiments.

FIG. 6A illustrates a system and a process for responding to a get request at an event-driven compute service, according to some embodiments. In the depicted example, the cache data 510*a*, 510*b*, 510*c* includes data items that have been updated with more recent data due to set requests from the client 506. For example, cache data 510*a* includes updated data 602 for the data corresponding to identifier 512*b* (which is more recent data than data 514*b* stored in cache data 510*c*), cache data 510*b* includes updated data 604 for the data corresponding to identifier 512*i* (which is more recent data than data 514*i* previously stored in cache data 510*b*), and updated data 606 for the data corresponding to identifier 512*c* (which is more recent data than data 514*a* stored in cache data 510*a* and cache data 510*b*). In embodiments, updated data may be data corresponding to a particular identifier of the data that has been modified by the client 506 or modified and then obtained by the client 506. Therefore, updated data 602 may be different from data 514*b* due to one or more modifications (e.g., insertions, replacements, and/or deletions) that were made to the data 514*b*.

In the depicted example, the event listener 136 receives a get request from the client 506, selects the container 504*a* according to a load balancing mechanism (e.g., based on one or more criteria), and sends event information based on the get request to the selected container 504*a*. In response to receiving the event information, the selected container 504*a* launches the registered cache function as active registered cache function 608. In embodiments, if the event information indicates (e.g., based on an identifier for the updated data that is included in the request) the get request is for the updated data 602, then the active registered cache function 608 may determine whether the updated data 602 is stored in the cache data 510*a* and if so, whether it is valid (e.g. not stale). If so, then the registered cache function 410*b* may return the data 514*c* to the client 506 or cause the data 514*c* to be returned to the client 506.

To determine whether the updated data 602 is valid, the active registered cache function 608 may determine whether the data 602 has been in the dedicated persistent storage for less than a threshold amount of time (e.g., time to live). If so, then the active registered cache function 608 sends the updated data to the client. In embodiments, the time to live may be a configuration parameter provided by the client in the request to establish the cache. In some cases, the time to live may instead be provided as a pre-defined parameter for the registered cache function (e.g., a parameter set by the provider network 102).

In embodiments, the active registered cache function 608 may determine that the data 602 has been in the dedicated persistent storage for less than the threshold amount of time (and thus the determine the data 602 is valid) or at least a threshold amount of time (and thus determine the data 602 is invalid or stale) based on a timestamp associated with the requested data. Thus, in some instances, the active registered cache function 608 may compare the timestamp to a current time and based on the comparison, determine an amount of time that the data 602 has been in the dedicated persistent storage.

As shown, a get request includes ID 512*a*, and the active registered cache function 608 determines that the data 514*a* has been in the dedicated persistent storage for at least the threshold amount of time. Therefore, a miss indication is returned to the client 506. In some cases, an indication that he the data is stale may instead be returned to the client 506. In embodiments, the stale data may also be returned to the client 506. If the active registered cache function 608 determines that the data 602 has not been in the dedicated persistent storage for at least the threshold amount of time, then the data 514*a* is returned to the client 506.

Figure 6B:
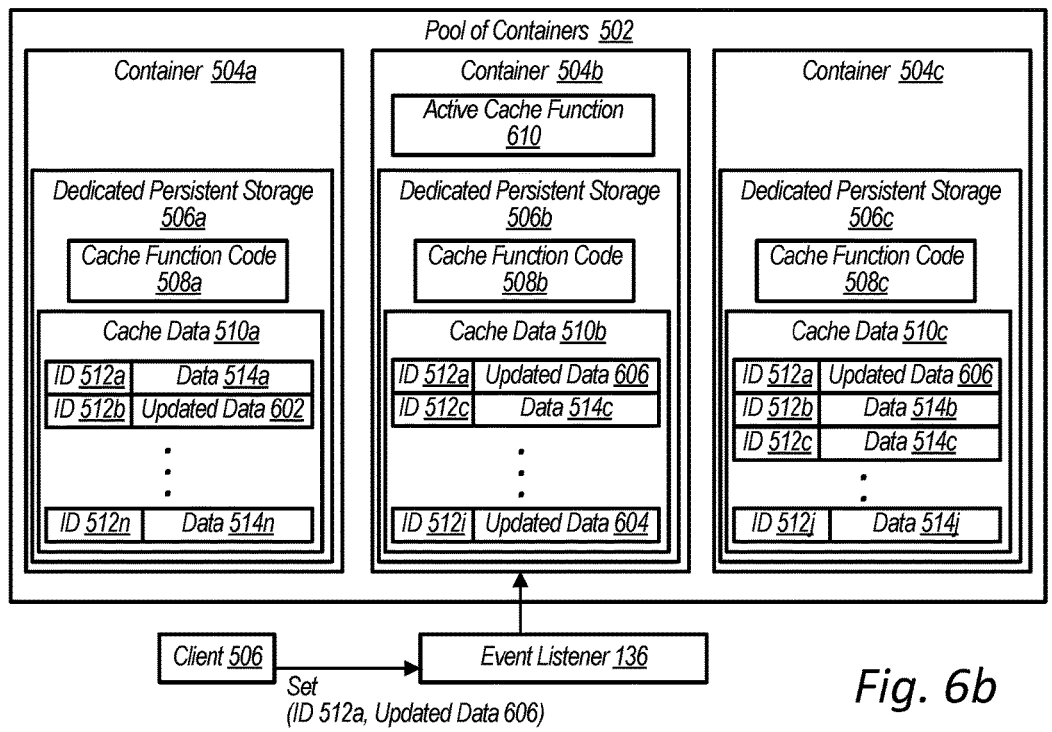
FIG. 6B illustrates a system and a process for responding to a set request at an event-driven compute service, according to some embodiments.

FIG. 6B illustrates a system and a process for responding to a set request at an event-driven compute service, according to some embodiments. In the depicted example, the event listener 136 receives a set request from the client 506, selects the container 504*b* according to a load balancing mechanism (e.g., based on one or more selection criteria), and sends event information based on the set request to the selected container 504*b*. For example, the event listener 136 may send the ID 512*a* and the updated data 606, which were included in the set request.

In response to receiving the event information, the selected container 504*b* launches the registered cache function as active registered cache function 610. In embodiments, if the event information indicates (e.g., via an identifier 512*a* for the updated data 606) the set request is for data corresponding to the identifier 512*a*, then the active registered cache function 610 may replace the previous data 514*a* with the updated data 606 in the cache data 510*b* (e.g., write over the previous data 514*a* with the updated data 606).

Figure 7:
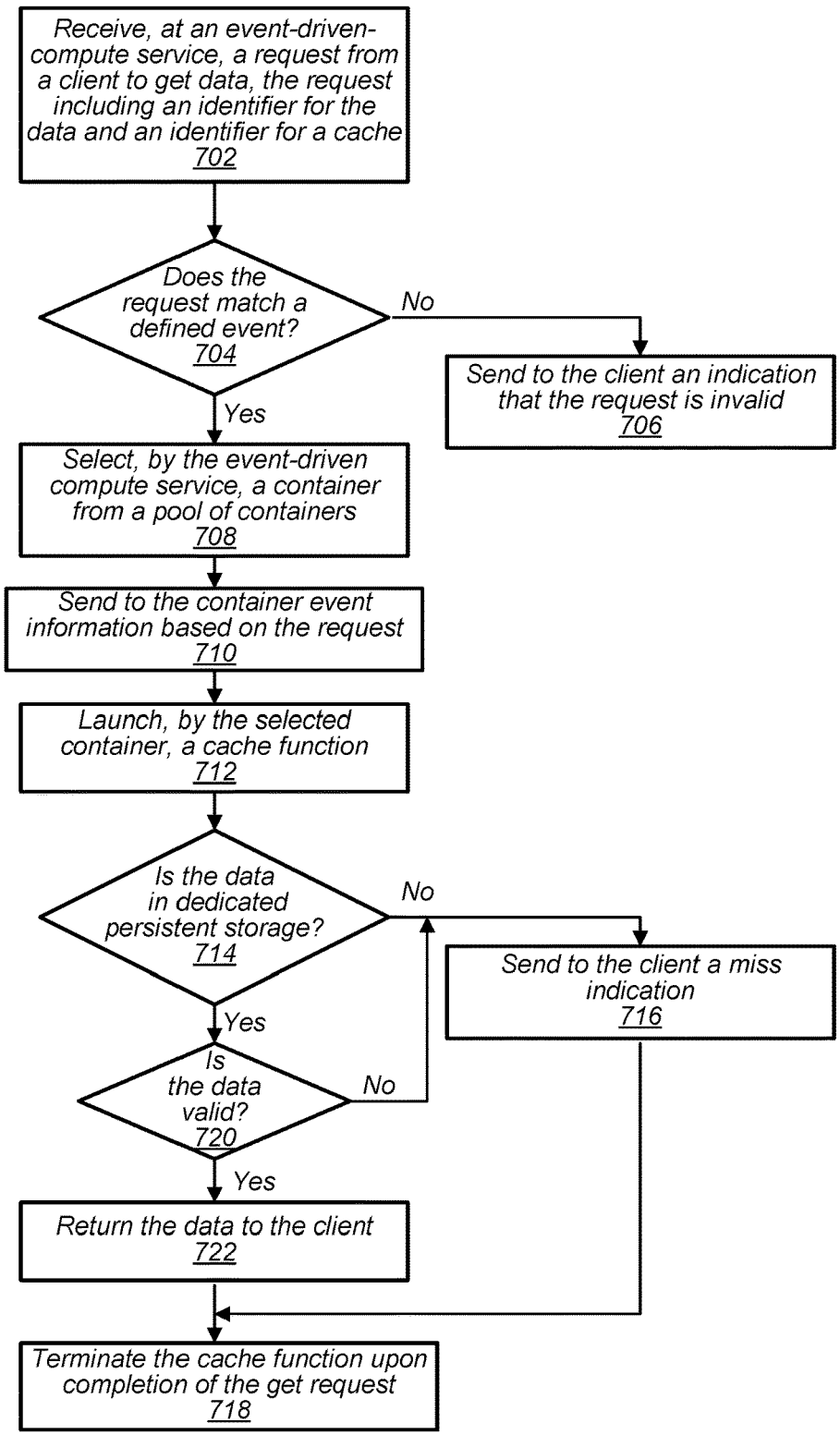
FIG. 7 is a flow diagram of a process for responding, at an event-driven compute service, to a request to get data from a cache, according to some embodiments.

FIG. 7 is a flow diagram of a process for responding, at an event-driven compute service, to a request to get data from a cache, according to some embodiments. One or more portions of the illustrated process may be performed via one or more components of an event-driven compute service and/or other components of a provider network, such as provider network 102.

At block 702, an event-driven compute service receives a request from a client to get data. The request may include an identifier for the data and/or an identifier for a cache. In embodiments, the request may include other information, such as an endpoint (e.g., network address) of the provider network or of the event-driven compute service.

At block 704, the event-driven compute service determines whether the request matches a defined event. In embodiments, this may include determining whether the type of request and/or data in the request matches a defined event. For example, a defined event may specify one or more of: a "get" request or a "set" request, a client identifier, a network address of the sender of the request, a network address of the recipient of the request, an identifier for a cache, an identifier for data, and any other suitable data that may be included in the request.

If the event-driven compute service determines that the request does not match a defined event, then at block 706, the event-driven compute service sends to the client an indication that the request is invalid (e.g., an error message). If the event-driven compute service determines that the request does match a defined event, then at block 708, the event-driven compute service selects a container from a pool of containers assigned to a registered cache function. At block 710, the event-driven compute service sends to the container event information based on the request. For example, the type of request and/or any of the data included in the request may be sent to the selected container.

At block 712, the event-driven compute service launches the registered cache function that the container is assigned to, so that the registered cache function is active (e.g., executing, running, etc.). In embodiments, function code for the registered cache function is already stored in a dedicated persistent storage of the container. At block 714, the event-driven compute service determines whether the data corresponding to the identifier for the data is in the dedicated persistent storage. If not, then the event-driven compute service sends to the client a miss indication at block 716 and then terminates the active registered cache function at block 718. If so, then at block 720, the event-driven compute service determines whether the data corresponding to the identifier for the data in the dedicated persistent storage is valid. If not, then the event-driven compute service sends to the client a miss indication at block 716 and then terminates the active registered cache function at block 718.

If the event-driven compute service determines that the data corresponding to the identifier for the data in the dedicated persistent storage is valid, then at block 722, the event-driven compute service returns (e.g., sends, transmits) the data corresponding to the identifier for the data in the dedicated persistent storage to the client. Then, at block 718, the event-driven compute service terminates the active registered cache function. In some embodiments, some or all of the data in the dedicated persistent storage remains in the dedicated persistent storage when the function is terminated. In embodiments, the container does not consume any compute resources of the provider network when after the function is terminated (e.g., when the function is not active). In some cases, the container is frozen and/or put into a suspended state.

Figure 8:
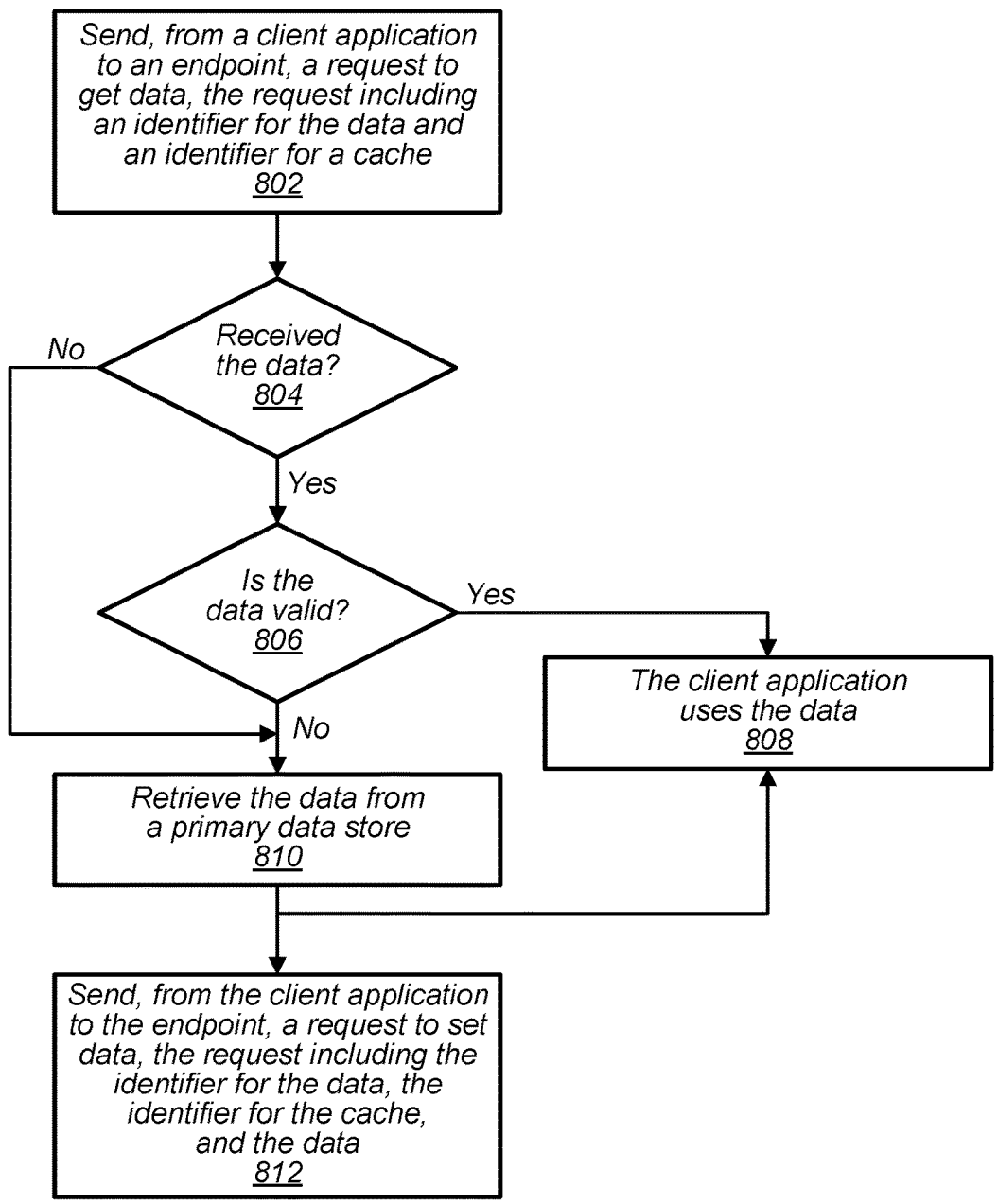
FIG. 8 is a flow diagram of a process for sending, from a client, a request to get data from a cache, according to some embodiments.

FIG. 8 is a flow diagram of a process for sending, from a client, a request to get data from a cache, according to some embodiments. One or more portions of the illustrated process may be performed via one or more components of a client (e.g., one or more client computing devices and/or client software application).

At block 802, the client sends, to an endpoint (e.g., network address of or associated with a provider network, network address of an event-driven compute service), a request to get data. In embodiments, the request may include an identifier for the data and/or an identifier for a cache. In embodiments, the request may include other information, such as an endpoint (e.g., network address) of the provider network or of the event-driven compute service.

At block 804, the client determines whether the requested data was received. In embodiments, this may include determining whether the requested data has been received within a threshold period of time. If the client determines that the requested data is received, then at block 806, the client determines whether the data is valid. In various embodiments, the client may determine whether the data is valid based on metadata included or returned with the data (e.g., a timestamp). For example, the client may determine that the data is valid (e.g., not stale) if the timestamp is for a later time than a threshold time or the client may determine that the data is not valid (e.g., stale) if the timestamp is for an earlier recent time than the threshold time or the same time as the threshold time.

If the client determines that the data is valid, then at block 808, the client uses the data. If not, then at block 810, the client retrieves the data from a primary data store. Returning to block 804, if the client determines that the requested data was not received, then at block 810, the client retrieves the data from a primary data store. Next, at block 812, the client sends to the endpoint a request to set data. In embodiments, the request to set data includes one or more of the identifier for the data, the identifier for the cache, and the data retrieved from the primary data store. In some cases, the client may receive a confirmation message that the set was set in the cache.

Figure 9:
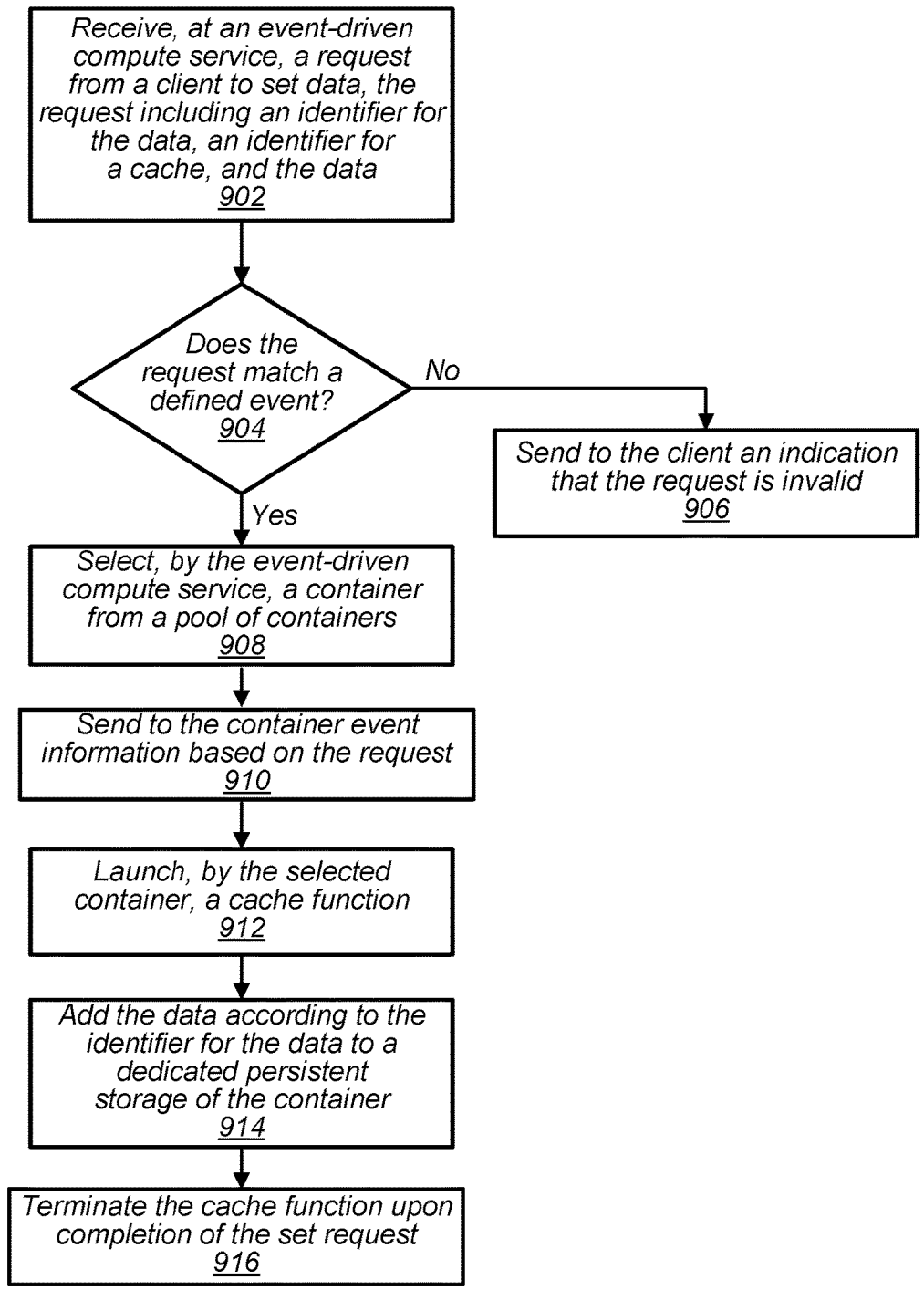
FIG. 9 is a flow diagram of a process for responding, at an event-driven compute service, to a request to set data to a cache, according to some embodiments.

FIG. 9 is a flow diagram of a process for responding, at an event-driven compute service, to a request to set data to a cache, according to some embodiments. One or more portions of the illustrated process may be performed via one or more components of an event-driven compute service and/or other components of a provider network, such as provider network 102.

At block 902, an event-driven compute service receives a request from a client to set data. The request may include one or more of an identifier for the data, an identifier for a cache, and the data. In embodiments, the request may include other information, such as an endpoint (e.g., network address) of the provider network or of the event-driven compute service.

At block 904, the event-driven compute service determines whether the request matches a defined event. In embodiments, this may include determining whether the type of request and/or data in the request matches a defined event. For example, a defined event may specify one or more of: a "get" request or a "set" request, a client identifier, a network address of the sender of the request, a network address of the recipient of the request, an identifier for a cache, an identifier for data, and any other suitable data that may be included in the request.

If the event-driven compute service determines that the request does not match a defined event, then at block 906, the event-driven compute service sends to the client an indication that the request is invalid (e.g., an error message). If the event-driven compute service determines that the request does match a defined event, then at block 908, the event-driven compute service selects a container from a pool of containers assigned to a registered cache function. At block 910, the event-driven compute service sends to the container event information based on the request. For example, the type of request and/or any of the data included in the request may be sent to the selected container.

At block 912, the event-driven compute service launches the registered cache function that the container is assigned to, so that the registered cache function is active (e.g., executing, running, etc.). In embodiments, function code for the registered cache function is already stored in a dedicated persistent storage of the container. At block 914, the event-driven compute service adds the data according to the identifier for the data to a dedicated persistent storage of the container.

At block 916, the event-driven compute service terminates the active registered cache function. In some embodiments, some or all of the data in the dedicated persistent storage remains in the dedicated persistent storage when the function is terminated (including the data for the set request that was added to the dedicated persistent storage). In embodiments, the container does not consume any compute resources of the provider network when after the function is terminated (e.g., when the function is not active). In some cases, the container is frozen and/or put into a suspended state.

Figure 10:
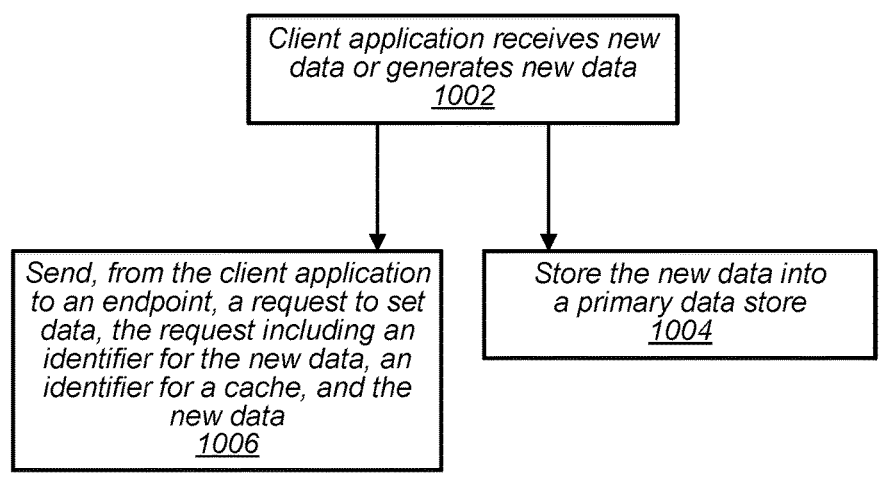
FIG. 10 is a flow diagram of a process for sending, by a client application, a request to set data to a cache, according to some embodiments.

FIG. 10 is a flow diagram of a process for sending, by a client application, a request to set data to a cache, according to some embodiments. One or more portions of the illustrated process may be performed via one or more components of a client (e.g., one or more client computing devices and/or client software application).

At block 1002, the client receives new data or generates new data. For example a client application may receive new data from another application or data source or generate new data. In response, the client stores the new data into a primary data store at block 1004. Also in response to receiving the new data or generating the new data, at block 1006, the client sends to the endpoint a request to set data. In embodiments, the request to set data includes one or more of an identifier for the data, an identifier for the cache, and the new data. In some embodiments, the request may include other information, such as an endpoint (e.g., network address) of the provider network or of the event-driven compute service.

Figure 11:
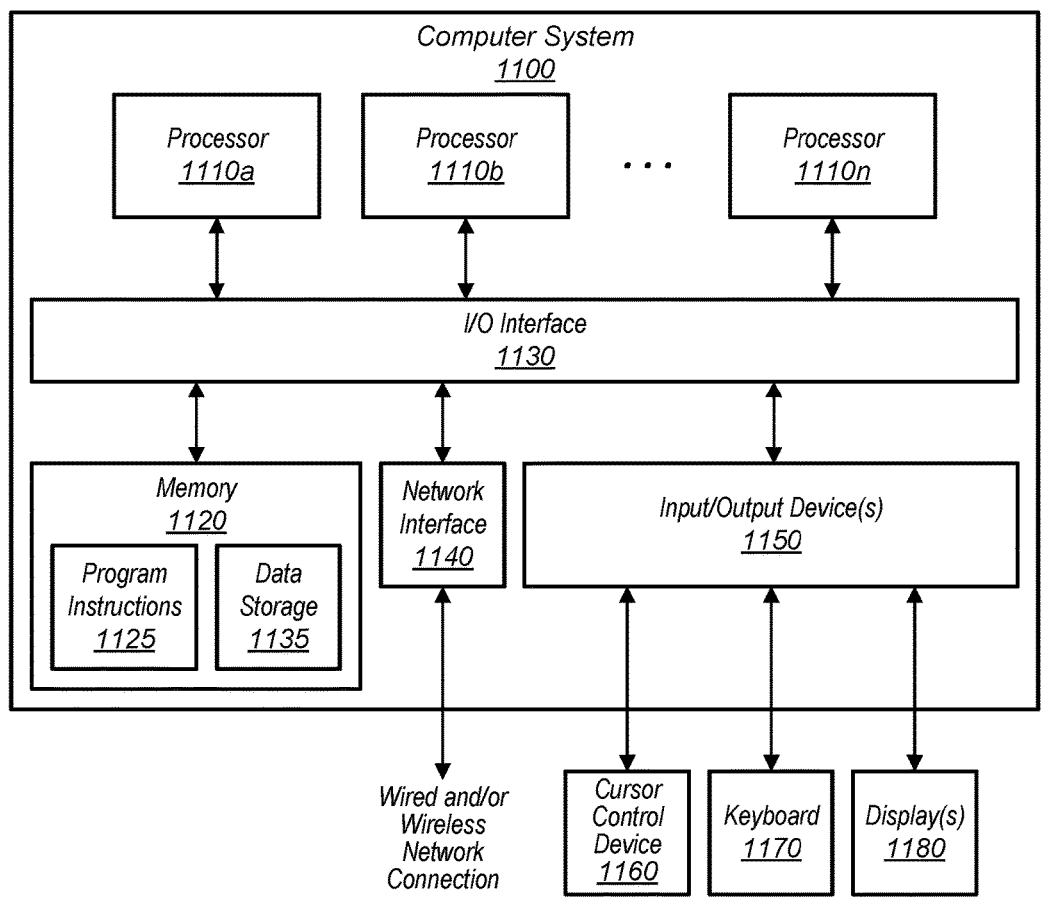
FIG. 11 is a block diagram illustrating an example computer system that implements some or all of the techniques described herein, according to some embodiments.

Any of various computer systems may be configured to implement processes associated with an event-driven cache. For example, FIG. 11 is a block diagram illustrating one embodiment of a computer system suitable for implementing some or all of the techniques described herein. For example, the one or more of the computer systems may host one or more respective containers. In some cases, a host computer system may host multiple containers. In various embodiments, the provider network may include one or more computer systems 1100 such as that illustrated in FIG. 11 or one or more components of the computer system 1100 that function in a same or similar way as described for the computer system 1100.

In the illustrated embodiment, computer system 1100 includes one or more processors 1110 coupled to a system memory 1120 via an input/output (I/O) interface 1130. Computer system 1100 further includes a network interface 1140 coupled to I/O interface 1130. In some embodiments, computer system 1100 may be illustrative of servers implementing enterprise logic or downloadable application, while in other embodiments servers may include more, fewer, or different elements than computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be embedded processors implementing any of a variety of instruction set architectures (ISAs), such as the x106, PowerPC, SPARC, or MIPS ISAs, or any other suitable ISA. In multiprocessor systems, each of processors 1110 may commonly, but not necessarily, implement the same ISA.

System memory 1120 may be configured to store instructions and data accessible by processor 1110. In various embodiments, system memory 1120 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the downloadable software or provider network are shown stored within system memory 1120 as program instructions 1125. In some embodiments, system memory 1120 may include data 1135 which may be configured as described herein.

In one embodiment, I/O interface 1130 may be configured to coordinate I/O traffic between processor 1110, system memory 1120 and any peripheral devices in the system, including through network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments, some or all of the functionality of I/O interface 1130, such as an interface to system memory 1120, may be incorporated directly into processor 1110.

Network interface 1140 may be configured to allow data to be exchanged between computer system 1100 and other devices attached to a network, such as between the shippable storage device 100 and other computer systems, for example. In particular, network interface 1140 may be configured to allow communication between computer system 1100 and/or various I/O devices 1150. I/O devices 1150 may include scanning devices, display devices, input devices and/or other communication devices, as described herein. Network interface 1140 may commonly support one or more wireless networking protocols (e.g., Wi-Fi/IEEE 802.7, or another wireless networking standard). However, in various embodiments, network interface 1140 may support communication via any suitable wired or wireless general data networks, such as other types of Ethernet networks, for example. Additionally, network interface 1140 may support communication via telecommunications/telephony networks such as analog voice networks or digital fiber communications networks, via storage area networks such as Fibre Channel SANs, or via any other suitable type of network and/or protocol.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 1100 via I/O interface 1130. A computer-readable storage medium may also include any volatile or non-volatile media such as RAM (e.g. SDRAM, DDR SDRAM, RDRAM, SRAM, etc.), ROM, etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

In some embodiments, I/O devices 1150 may be relatively simple or "thin" client devices. For example, I/O devices 1150 may be configured as dumb terminals with display, data entry and communications capabilities, but otherwise little computational functionality. However, in some embodiments, I/O devices 1150 may be computer systems configured similarly to computer system 1100, including one or more processors 1110 and various other devices (though in some embodiments, a computer system 1100 implementing an I/O device 1150 may have somewhat different devices, or different classes of devices).

In various embodiments, I/O devices 1150 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 1150 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 1100. In general, an I/O device 1150 (e.g., cursor control device, keyboard, or display(s) may be any device that can communicate with elements of computing system 1100.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
   one or more computing devices configured to implement an event-driven-cache service for a plurality of clients, wherein the event-driven-cache service is configured to, in response to a request from a particular client to establish a cache:
      register a cache function in an event-driven compute service,
      assign an identifier for the registered cache function, and
      define events that trigger the registered cache function in the event-driven compute service; and
   a plurality of computing devices configured to implement the event-driven compute service, wherein the event-driven compute service is configured to:
      receive a request to get data from or set data to the cache, wherein the request includes an identifier for the data and an identifier for the cache;
      in response to a determination that the request matches a defined event to trigger the registered cache function, send event information based on the request to a selected container on one of the plurality of computing devices of the event-driven compute service, wherein the selected container is configured to launch the registered cache function in response to receiving the event information, and the registered cache function is configured to:
         for a request to set data indicated in the event information, add the data according to the identifier for the data to a dedicated persistent storage of the container, or
         for a request to get data indicated in the event information, determine whether the data corresponding to the identifier for the data is valid in the dedicated persistent storage and either return the data or a miss indication to the particular client;
      wherein the selected container is configured to terminate the registered cache function upon completion of the request to set data or request to get data, wherein the data remains in the dedicated persistent storage of the container after the registered cache function is terminated.

2. The system as recited in claim 1, wherein to determine whether the data corresponding to the identifier for the data is valid in the dedicated persistent storage, the registered cache function is configured to:
   determine whether the data corresponding to the identifier for the data is in the dedicated persistent storage; and
   in response to a determination that the data corresponding to the identifier for the data is in the dedicated persistent storage:
      determine that the data is valid if the data has been in the dedicated persistent storage for less than a threshold amount of time, or
      determine that the data is not valid if the data has been in the dedicated persistent storage for at least the threshold amount of time.

3. The system as recited in claim 1, wherein the selected container is one of a pool of containers on at least a subset of the plurality of computing devices of the event-driven compute service, wherein each container of the pool of containers is assigned to the registered cache function, and wherein the event-driven compute service is configured to:
   select, according to a load balancing mechanism, different ones of the pool of containers in response to determinations that different requests match one of the defined events that trigger the registered cache function.

4. The system as recited in claim 3, wherein the request is a request to get data from the cache, and wherein the event-driven compute service is configured to:
   determine that the data corresponding to the identifier for the data is valid in the dedicated persistent storage;
   return the data to the particular client;
   receive another request to get the data from the cache, wherein the another request includes the identifier for the data and the identifier for the cache; and
   in response to a determination that the another request matches a defined event to trigger the registered cache function, send event information based on the another request to another selected container of the pool of containers, wherein the another selected container is configured to launch the registered cache function in response to receiving the event information, and the registered cache function is configured to:
      determine that the data corresponding to the identifier for the data is not valid in dedicated persistent storage of the another selected container and return a miss indication to the particular client;
   wherein the another selected container is configured to terminate the registered cache function upon completion of the another request to get data.

5. The system as recited in claim 4, wherein the event-driven compute service is configured to:

receive a request to set the data to the cache, wherein the request to set includes the identifier for the data and the identifier for the cache; and in response to a determination that the request to set matches a defined event to trigger the registered cache function, send event information based on the request to set to a selected container of the pool of containers, wherein the selected container is configured to launch the registered cache function in response to receiving the event information, and the registered cache function is configured to:

add the data according to the identifier for the data to a dedicated persistent storage of the selected container;

wherein the selected container is configured to terminate the registered cache function upon completion of the request to set, wherein the data remains in the dedicated persistent storage of the selected container after the registered cache function is terminated.

6. A method, comprising:

performing, by an event-driven-cache service implemented by one or more computing devices of a provider network:

receiving a request from a client to establish a cache; and in response to receiving the request to establish the cache:

registering a cache function in an event-driven compute service of the provider network;

assigning an identifier for the registered cache function; and defining one or more events that trigger the registered cache function in the event-driven compute service, wherein the registered cache function is configured to launch in the event-driven compute service in response to determining, by the event-driven compute service, that a received request to get data from or set data to the cache matches the defined event to trigger the registered cache function.

7. The method as recited in claim 6, further comprising sending, from the event-driven-cache service to the client, an identifier for the cache or an endpoint for accessing the cache.

8. The method as recited in claim 6, further comprising sending, from the event-driven-cache service to the client, a client-side library usable to access the cache, wherein the client-side library includes a code for:

sending, from the client to the event-driven compute service, the request to get data, wherein the request includes an identifier for the cache and an identifier for the data;

in response to receiving, from the event-driven compute service, a miss indication corresponding to the request to get data, retrieving the data from a primary data store; and sending, to the event-driven compute service, a request to set the data, wherein the request includes an identifier for the cache, an identifier for the data, and the data.

9. The method as recited in claim 6, further comprising performing, by the event-driven compute service implemented by a plurality of computing devices of the provider network:

receiving a request to get data from or set data to the cache, wherein the request includes an identifier for the data and an identifier for the cache;

in response to determining that the request matches the defined event to trigger the registered cache function, sending event information based on the request to a selected container on one of the plurality of computing devices of the event-driven compute service;

in response to receiving, at the container, the event information, launching the registered cache function;

in response to determining by the registered cache function, based on the event information, that the request is a request to set data, adding the data according to the identifier for the data to a dedicated persistent storage of the container, or in response to determining by the registered cache function, based on the event information, that the request is a request to get data, determining by the registered cache function whether the data corresponding to the identifier for the data is valid in the dedicated persistent storage and either returning the data or a miss indication to the client; and terminating, by the container, the registered cache function upon completion of the request to set data or request to get data, wherein the data remains in the dedicated persistent storage of the container after the registered cache function is terminated.

10. The method as recited in claim 9, wherein determining by the registered cache function whether the data corresponding to the identifier for the data is valid in the dedicated persistent storage comprises:

determining whether the data corresponding to the identifier for the data is in the dedicated persistent storage; and in response to determining that the data corresponding to the identifier for the data is in the dedicated persistent storage:

determining that the data is valid if the data has been in the dedicated persistent storage for less than a threshold amount of time, or determining that the data is not valid if the data has been in the dedicated persistent storage for at least the threshold amount of time.

11. The method as recited in claim 9, further comprising:

receiving, at the one of the plurality of computing devices of the event-driven compute service, an initial request to launch the registered cache function;

in response to receiving the initial request to launch the registered cache function, launching the container;

receiving, by the container, function code for the registered cache function;

in response to receiving, by the container, the function code for the registered cache function, storing, by the container, the function code into the dedicated persistent storage of the container; and launching, by the container, the registered cache function.

12. The method as recited in claim 9, wherein the selected container is one of a pool of containers on at least a subset of the plurality of computing devices of the event-driven compute service, wherein each container of the pool of containers is assigned to the registered cache function, and further comprising:

selecting, according to a load balancing mechanism, different ones of the pool of containers in response to determinations that different requests match one of the defined events that trigger the registered cache function.

13. The method as recited in claim 12, further comprising adding another container to the pool of containers assigned to the registered cache function.

14. The method as recited in claim 6, further comprising:
sending, from the client to the event-driven compute service, the request to get data, wherein the request includes an identifier for the cache and an identifier for the data; and
in response to receiving, from the event-driven compute service, a miss indication corresponding to the request to get data:
retrieving the data from a primary data store; and
sending, to the event-driven compute service, a request to set the data, wherein the request includes an identifier for the cache, an identifier for the data, and the data.

15. The method as recited in claim 6, further comprising:
sending, from the client to the event-driven compute service, the request to get data, wherein the request includes an identifier for the cache and an identifier for the data;
in response to receiving the data from the event-driven compute service, determining, by the client, whether the data is valid; and
in response to determining that the data is not valid:
retrieving the data from a primary data store; and
sending, to the event-driven compute service, a request to set the data, wherein the request includes an identifier for the cache, an identifier for the data, and the data.

16. A non-transitory computer-readable storage medium storing program instructions that, when executed by a computing device of an event-driven compute service, causes the computing device to implement:
receiving, at a selected container of the computing device, event information based on a request from a client to get data from or set data to a cache, wherein the event information comprises an identifier for the data;
in response to receiving the event information, launching, by the container, a registered cache function;
in response to determining by the registered cache function, based on the event information, that the request is a request to set data, adding the data according to the identifier for the data to a dedicated persistent storage of the container, or
in response to determining by the registered cache function, based on the event information, that the request is a request to get data, determining by the registered cache function whether the data corresponding to the identifier for the data is valid in the dedicated persistent storage and either returning the data or a miss indication to the client; and
terminating, by the container, the registered cache function upon completion of the request to get data or request to set data, wherein the data remains in the dedicated persistent storage of the container after the registered cache function is terminated.

17. The non-transitory, computer-readable storage medium of claim 16, wherein to determine whether the data corresponding to the identifier for the data is valid in the dedicated persistent storage, the program instructions cause the computing device to implement:
determining whether the data corresponding to the identifier for the data is in the dedicated persistent storage; and
in response to determining that the data corresponding to the identifier for the data is in the dedicated persistent storage:
determining that the data is valid if the data has been in the dedicated persistent storage for less than a threshold amount of time, or
determining that the data is not valid if the data has been in the dedicated persistent storage for at least the threshold amount of time.

18. The non-transitory, computer-readable storage medium of claim 17, wherein the program instructions cause the computing device to implement:
determining that the data has been in the dedicated persistent storage for less than the threshold amount of time or at least the threshold amount of time based on a timestamp associated with the data.

19. The non-transitory, computer-readable storage medium of claim 16, wherein the program instructions cause the computing device to implement:
receiving, at the one of the plurality of computing devices of the event-driven compute service, an initial request to launch the registered cache function; and
in response to receiving the initial request to launch the registered cache function, launching the container.

20. The non-transitory, computer-readable storage medium of claim 19, wherein the program instructions cause the computing device to implement:
receiving, by the container, function code for the registered cache function;
in response to receiving, by the container, the function code for the registered cache function, storing, by the container, the function code into the dedicated persistent storage of the container; and
launching, by the container, the registered cache function.

* * * * *